United States Patent
Duduta et al.

(10) Patent No.: US 12,482,851 B2
(45) Date of Patent: Nov. 25, 2025

(54) METHOD FOR FABRICATION OF ULTRA LIGHTWEIGHT, HIGH POWER DENSITY LITHIUM ION BATTERIES

(71) Applicant: President and Fellows of Harvard College, Cambridge, MA (US)

(72) Inventors: Mihai Duduta, Cambridge, MA (US); David Clarke, Cambridge, MA (US); Robert J. Wood, Cambridge, MA (US); Sebastien de Rivaz, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 907 days.

(21) Appl. No.: 16/978,654

(22) PCT Filed: Mar. 6, 2019

(86) PCT No.: PCT/US2019/020968
§ 371 (c)(1),
(2) Date: Sep. 4, 2020

(87) PCT Pub. No.: WO2019/173485
PCT Pub. Date: Sep. 12, 2019

(65) Prior Publication Data
US 2020/0403193 A1 Dec. 24, 2020

Related U.S. Application Data

(60) Provisional application No. 62/639,267, filed on Mar. 6, 2018.

(51) Int. Cl.
*H01M 50/51* (2021.01)
*H01M 10/0525* (2010.01)
(Continued)

(52) U.S. Cl.
CPC ... *H01M 10/0525* (2013.01); *H01M 10/0585* (2013.01); *H01M 50/105* (2021.01); *H01M 50/121* (2021.01); *H01M 2220/30* (2013.01)

(58) Field of Classification Search
CPC ......... H01M 10/0525; H01M 10/0585; H01M 50/105; H01M 50/121; H01M 2220/30;
(Continued)

(56) References Cited

U.S. PATENT DOCUMENTS 4,507,857 A 4/1985 Epstein et al.
6,461,757 B1 * 10/2002 Sasayama ........... H01M 50/121
429/211
(Continued)

OTHER PUBLICATIONS

International Search Report and Written Opinion mailed May 24, 2019 in connection with International Application No. PCT/US2019/020968.
(Continued)

*Primary Examiner* — Christian Roldan
(74) *Attorney, Agent, or Firm* — Wolf, Greenfield & Sacks, P.C.

(57) ABSTRACT

Methods and apparatus for fabricating a lightweight high power battery. The battery comprises an active structure including an anode electrode, a cathode electrode, and a separator material arranged between the anode electrode and the cathode electrode, a liquid electrolyte; and a non-metallic pouch arranged to encapsulate the active structure and the liquid electrolyte.

9 Claims, 9 Drawing Sheets

(51) Int. Cl.
*H01M 10/0585* (2010.01)
*H01M 50/105* (2021.01)
*H01M 50/121* (2021.01)

(58) Field of Classification Search
CPC ..... H01M 50/124; H01M 50/51; Y02E 60/10; Y02P 70/50
USPC ......................................................... 429/158
See application file for complete search history.

(56) References Cited

U.S. PATENT DOCUMENTS

| 2007/0207379 | A1* | 9/2007 | Hatta | H01M 10/48 |
| | | | | 383/109 |
| 2008/0268327 | A1* | 10/2008 | Gordon | H01M 4/40 |
| | | | | 429/231.9 |
| 2011/0045337 | A1* | 2/2011 | Lee | H01M 6/181 |
| | | | | 29/623.2 |
| 2011/0059355 | A1* | 3/2011 | Zhang | H01M 4/8652 |
| | | | | 429/188 |
| 2013/0149602 | A1 | 6/2013 | Luski et al. | |
| 2013/0273443 | A1 | 10/2013 | Zhang et al. | |
| 2014/0242445 | A1 | 8/2014 | Gozdz et al. | |
| 2014/0377632 | A1 | 12/2014 | Huang | |

OTHER PUBLICATIONS

International Preliminary Report on Patentability mailed Sep. 17, 2020 in connection with International Application No. PCT/US2019/020968.

[No Author Listed], Ultra low weight lithium ion batteries. Sep. 4, 2017. 3 pages. URL:https://web.archive.org/web/20170904005159/https://www.powerstream.com/ultra-light.htm [retrieved on Apr. 17, 2019].

Duduta et al., Ultra-Lightweight, High Power Density Lithium-Ion Batteries. Batteries & Supercaps Communications. Oct. 2018;1(4):131-4. doi:10.1002/batt.201800030.

PCT/US2019/020968, May 24, 2019, International Search Report and Written Opinion.

PCT/US2019/020968, Sep. 17, 2020, International Preliminary Report on Patentability.

* cited by examiner

METHOD FOR FABRICATION OF ULTRA LIGHTWEIGHT, HIGH POWER DENSITY LITHIUM ION BATTERIES

RELATED APPLICATIONS

The application is a national stage filing under 35 U.S.C. § 371 of international application number PCT/US2019/020968, filed Mar. 6, 2019, entitled "METHOD FOR FABRICATION OF ULTRA LIGHTWEIGHT, HIGH POWER DENSITY LITHIUM ION BATTERIES," which claims the benefit under 35 U.S.C. § 119(e) to U.S. Provisional Application Ser. No. 62/639,267, filed Mar. 6, 2018, entitled "METHOD FOR FABRICATION OF ULTRA LIGHTWEIGHT, HIGH POWER DENSITY LITHIUM ION BATTERIES," the entire contents of each of which are incorporated herein by reference.

FEDERALLY SPONSORED RESEARCH

This invention was made with government support under 1420570 awarded by National Science Foundation (NSF). The government has certain rights in the invention.

BACKGROUND

Lithium ion (Li-ion) batteries are commonly used as rechargeable power sources in mobile and/or small electronics such as laptop computers, smartphones and home electronics. Li-ion battery cells include sheets of anode and cathode electrode material separated by a separator material, and are typically either formed into a prismatic or rolled (e.g., cylindrical) shape. A metallized pouch and/or metal can may be used to encapsulate the anode/separator/cathode structure and a liquid electrolyte solution that permits transfer of lithium ions between the anode and cathode electrodes. Furthermore, a metal can may provide additional rigidity and resistance to impact to the battery.

SUMMARY

Some embodiments are directed to a hybrid manufacturing approach for fabricating a lightweight battery with a high power density. The techniques described herein for fabricating a lightweight high power battery are versatile and can be modified to create customized shape and weight batteries, as well as solutions for unconventional requirements, such as deformable or high voltage (e.g., >3.7V) batteries. Such high power density batteries may be useful for a broad class of lightweight applications, including wearable and biomedical devices, as well as miniature robots.

Some embodiments are directed to lightweight high power battery. The lightweight high power battery comprises an active structure including an anode electrode, a cathode electrode, and a separator material arranged between the anode electrode and the cathode electrode, a liquid electrolyte, and a non-metallic pouch arranged to encapsulate the active structure and the liquid electrolyte.

Some embodiments are directed to a high voltage lithium ion battery. The high voltage lithium ion battery comprises a plurality of battery cells electrically connected in series, wherein each of the battery cells comprises an active structure including an anode electrode, a cathode electrode, and a separator material arranged between the anode electrode and the cathode electrode, a liquid electrolyte; and a non-metallic pouch arranged to encapsulate the active structure and the liquid electrolyte.

Some embodiments are directed to a method of fabricating a lightweight high power battery. The method comprises fabricating an anode structure by bonding a first portion of a metal backing of an anode electrode to a first non-metallic pouch foil, wherein the first non-metallic pouch foil includes an opening to expose a second portion of the metal backing of the anode electrode when bonded to the first non-metallic pouch foil, fabricating a cathode structure by bonding a first portion of a metal backing of cathode electrode to a second non-metallic pouch foil, wherein the second non-metallic pouch foil includes an opening to expose a second portion of the metal backing of the cathode electrode when bonded to the second non-metallic pouch foil, arranging a separating material between the anode structure and the cathode structure, and bonding the first non-metallic pouch foil to the second non-metallic pouch foil to create a pouch, adding a liquid electrolyte to the pouch, and sealing the pouch to encapsulate the liquid electrolyte within the pouch.

Some embodiments are directed to a method of fabricating a high voltage battery. The method comprises connecting in series, a plurality of battery cells, wherein each of the battery cells comprises an active structure including an anode electrode, a cathode electrode, and a separator material arranged between the anode electrode and the cathode electrode, a liquid electrolyte, and a non-metallic pouch arranged to encapsulate the active structure and the liquid electrolyte.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Miniaturization in robotics, haptics, wearable and biomedical technologies, and mobile computing for Internet of Things (IoT) technologies has resulted in a need for lightweight (e.g., <1 gram), high power density (e.g., >1 kW/kg for a duration of at least one second) Li-ion batteries that can be used as a power source for the electronics in such technologies. Existing fabrication technologies cannot be used to make batteries that are both lightweight and high power. Rather, current fabrication methods for Li-ion cells typically require a choice between cells with high energy density and cells with lightweight characteristics.

Batteries capable of high power operation typically use a liquid electrolyte solution. The protective materials used to encapsulate the liquid electrolyte and protect the battery components from environmental conditions such as moisture result in such high power batteries also being heavy. Protective materials commonly used in Li-ion batteries include a metal pouch and rigid container, described briefly above. Due to their weight, conventional high-power batteries that include heavy protective materials are unsuitable for use in electronics applications that require more lightweight batteries.

Some commercially-available lightweight (e.g., <1 gram) batteries reduce weight by replacing the liquid electrolyte solution with a solid electrolyte that is less susceptible to environmental conditions and as such requires less protective materials than batteries that use a liquid electrolyte. Conventional lightweight Li-ion batteries that employ solid-state components typically operate in a low-power regime such that their use is not suitable in electronics applications, including those mentioned above, in which a high-power energy source is required.

Figure 1:
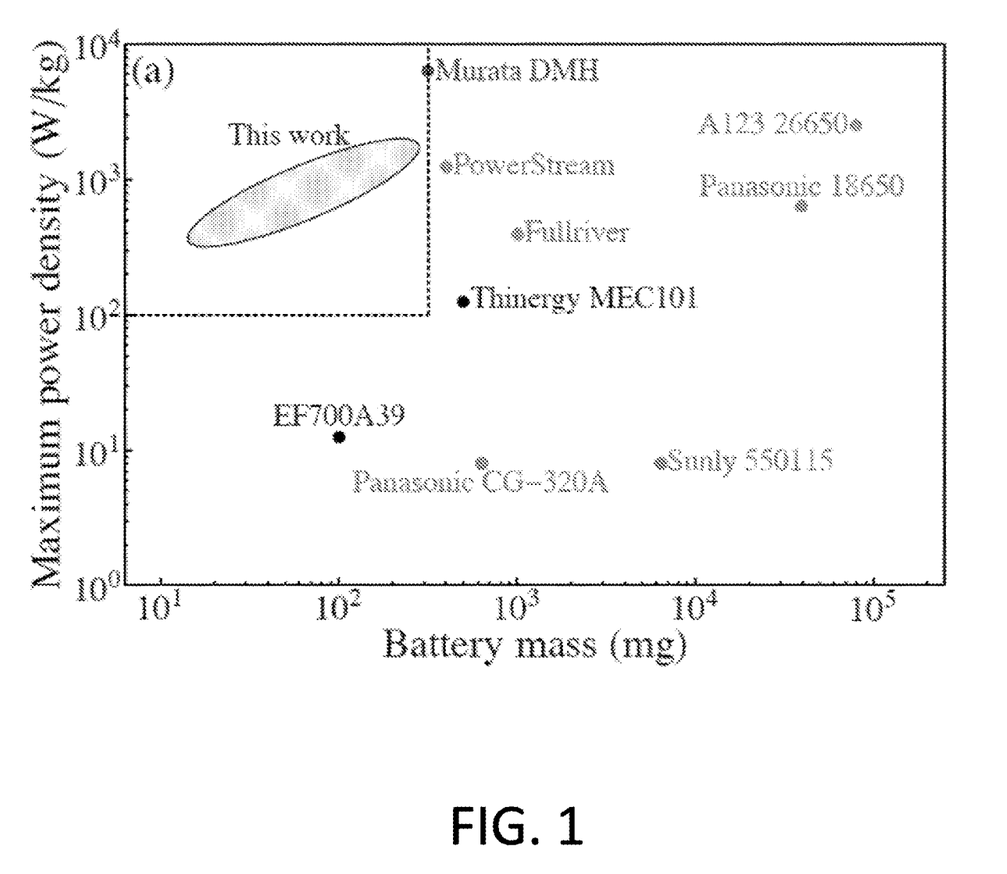
FIG. 1 is a plot of power density as a function of battery weight for some commercially-available batteries.

FIG. 1 shows a plot of maximum discharge power as a function of battery mass for some commercially-available battery cells. EF700A39 and Thinergy MEC101 are thin-film solid electrolyte cells, Murata DMH is a supercapacitor cell, and the remaining cells are conventional liquid electrolyte cells. The dashed lines in FIG. 1 define a battery characteristic regime of interest having both low weight (e.g., <300 mg) and high power (e.g., >100 W/kg) in which none of the identified commercially-available battery cells fall. Some embodiments are directed to a novel manufacturing approach which uses commercially-available lithium ion materials and a laser micro machining method to build lightweight (e.g., 10-200 mg) high power density (>1 kW/kg) batteries within the identified regime of interest.

Miniaturization of lightweight Li-ion batteries is limited by how the fabrication processes scale down. As discussed briefly above, conventional Li-ion electrodes that include a liquid electrolyte are typically made as planar sheets that are stacked into prismatic or cylindrical shapes. The stacked electrodes are infused with electrolyte, then sealed into a metallized film pouch, which prevents moisture from infiltrating into the battery. Then they are typically placed in a sturdy metal can. The materials and processes used to prevent moisture infiltration into the battery and the metal can significantly add to the total battery weight, and scale unfavorably as the size of the battery is reduced. Additionally, most nickel and aluminum current-collecting tabs used in commercially-available Li-ion batteries weigh hundreds of milligrams, and need large areas for reliable welding to the electrodes. For high power devices, tabs and welds need to be oversized to avoid excessive resistive heating during fast charge or discharge. Although some batteries have been demonstrated to deliver high power at small scale, the fabrication processes are either long duration, rely on unconventional materials, or are difficult to replicate.

Some embodiments are directed to a process for fabricating lightweight (e.g., <1 gram) small (e.g., mesoscale) power sources that fall within the regime outlined in FIG. 1. In some embodiments, a lightweight battery is fabricated that has a weight of less than 1 gram, less than 300 mg, less than 150 mg, or less than 50 mg. In some embodiments, the lightweight battery has a power density of at least 1 kW/kg for a duration of at least one second. As discussed in more detail below, some embodiments apply a laser micro manufacturing process to commercially-available materials to fabricate a novel battery that is both lightweight and high power. The use of laser micro machining enables, among other things, micron scale precision in cutting to shape, alignment, and scalable parallel fabrication of multiple batteries. Although specialized exotic materials may be used in some embodiments, embodiments that use commercially-available materials enables access to the widest range of high performance metal foils, anodes, cathodes, binders, separators, additives, and electrolytes.

To reduce battery weight, some embodiments reduce the amount of inactive (e.g., protective) components in the battery structure. For example, rather than using a metallized pouch foil and current collecting tabs as a protective structure for a liquid electrolyte, some embodiments use a non-metallic pouch material, such as a polymer (e.g., PET (polyethylene terephtalate) or a co-polymer with PET) that can be bonded to a metal backing on the anode and cathode electrodes of the active structure and can be bonded to itself to seal the pouch. As a result, some embodiments may be constructed using only single-sided electrodes, separator material, liquid electrolyte, and a thin polymer pouch. Compared to conventional metallized pouch materials, use of a non-metallic pouch material in accordance with some embodiments is lighter (e.g., 8× less weight for similar areas), and making connections to the metal backing of single-sided electrodes eliminates the need for current collecting tabs used in conventional devices.

As discussed above, most conventional high power batteries are designed using protective materials that increase battery lifetime so that the battery does not need to be replaced frequently. The inventors have recognized that not all applications require batteries having a long lifetime, and for certain applications, the benefits provided by the lightweight properties of batteries fabricated in accordance with the techniques described herein outweigh the reduced battery lifetime. In accordance with some embodiments, the standard cycle life performance of Li-ion is not taken as a primary design consideration for fabricating lightweight high-power batteries. Rather, the cycle and calendar life of the batteries is tailored to match the expected use of the final device in which the batteries are incorporated. For example, in a search and rescue operation employing multiple expendable flying drones, the expected lifetime will be on the range of hours to days. In another example, an application in which lightweight high-power batteries may be used is in disposable medical devices, such as an endoscopic capsule that records images as the capsule travels through a patient's digestive tract. A high power battery may be required in such a device to drive a flash for capturing the images, but the required lifespan of the device may be only a few days, after which it is disposed. Accordingly, the lifespan of the battery may only need to correspond to the lifespan of the device, which permits the use of less protective materials in the battery construction than a conventional high-power battery. To enable unique technologies, one aspect of lithium ion performance may be traded at the expense of another, in this case trading cycle life for power density.

Figure 2:
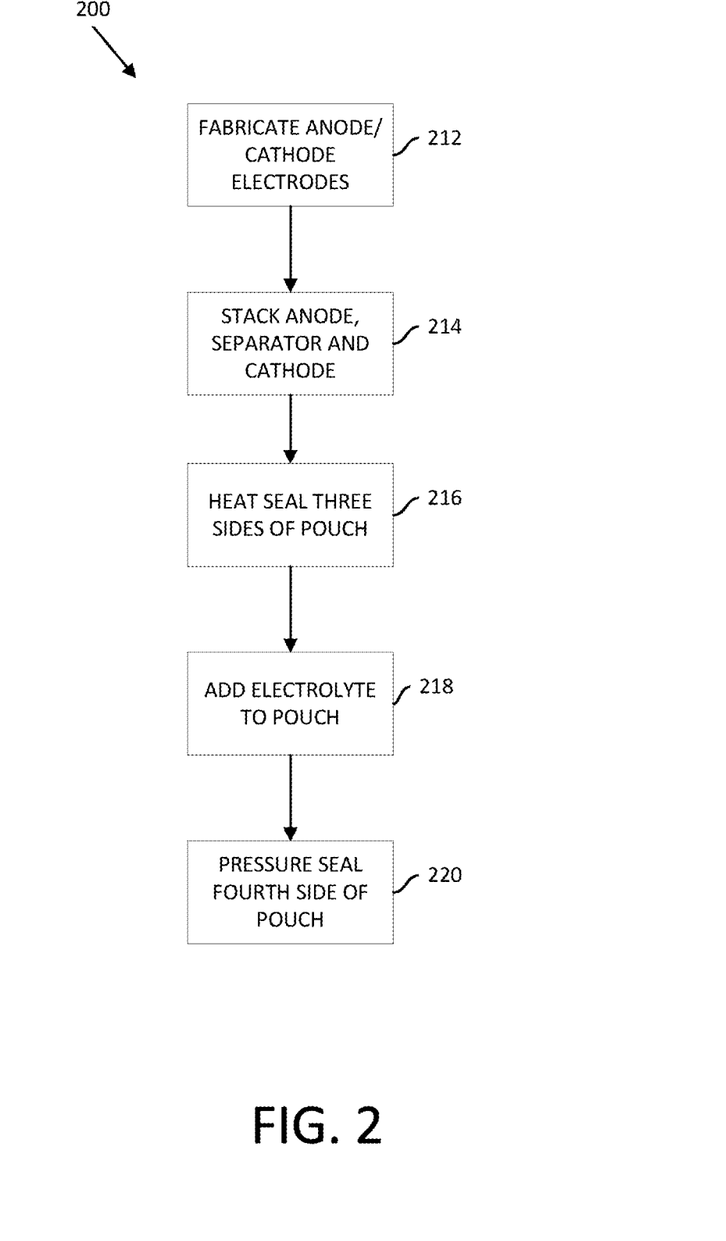
FIG. 2 is a flowchart of a process for fabricating a lightweight high power battery in accordance with some embodiments.

FIG. 2 illustrates a flowchart for a fabrication process 200 for creating a lightweight high-power battery in accordance with some embodiments. In act 210, anode and cathode electrodes for the battery are fabricated by cutting (e.g., laser cutting) and stacking active and pouch materials. A carrier film, such as a single sided adhesive (e.g., Gelpak, from Hayward, CA) may be used to ensure precise alignment of components in the stack. A step-by-step description of the laser cutting and assembly process is provided in FIGS. 3-5, discussed in more detail below. Following fabrication of the anode and cathode electrodes, process 200 proceeds to act 214, where the anode and cathode electrodes are stacked with a separator material arranged between the anode and cathode electrodes in the stack. The process 200 then proceeds to act 216, where sides of the pouch foil are heat sealed to provide the pouch which may be filled with a liquid electrolyte. In some embodiments, the liquid electrolyte comprises 1M LiPF6 in a 1:1 mixture of ethylene carbonate and dimethyl carbonate, available from Sigma Aldrich (St. Louis, MO). Process 200 then proceeds to act 218 where a liquid electrolyte is added to the pouch. Process 200 then proceeds to act 220 where the remaining side(s) of the pouch are pressure sealed to encapsulate the liquid electrolyte and active components within the pouch to create the lightweight high-power battery. Additionally, the non-metallic pouch may prevent the liquid electrolyte from being exposed to high voltages (e.g., >4.2V), which could result in irreversible electrolyte oxidation.

Figure 3A:
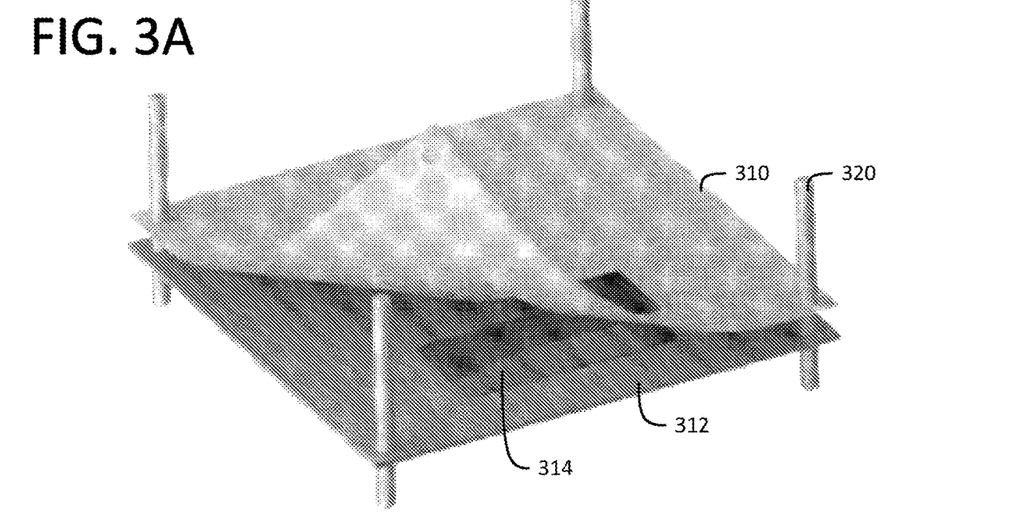
FIGS. 3A-3C schematically illustrate a fabrication process for creating an electrode for use in a lightweight high power battery in accordance with some embodiments.
Figure 3B:
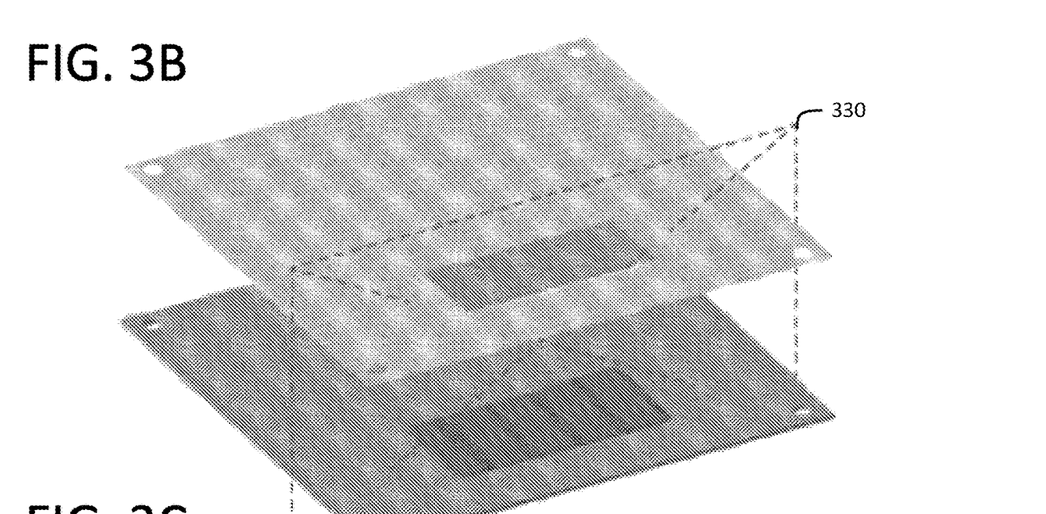
Figure 3C:
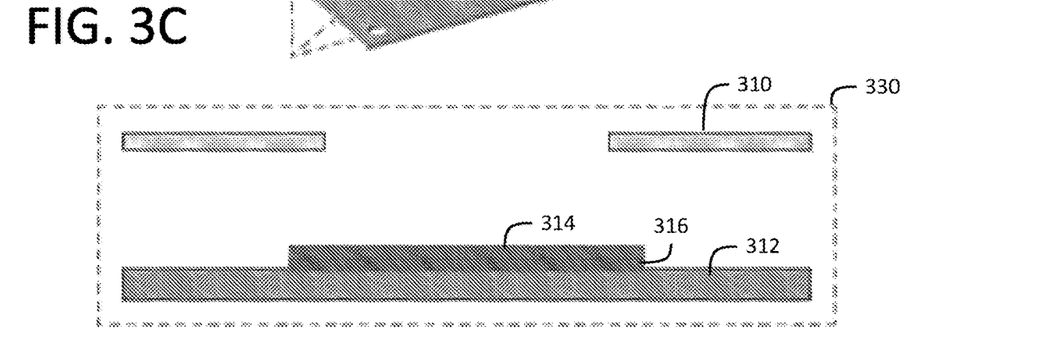

FIGS. 3A-3C show a process for fabricating an anode electrode in accordance with some embodiments. As shown, a pouch foil 310 may be laser cut to include an opening for electrical connections and alignment holes to facilitate alignment and stacking of layers. In some embodiments, the pouch foil 310 may be made of a polyester film such as PolyEthylene Terephtalate (PET) pouch foil material (Melinex 301H® polyester film), available from DuPont Corporation (Wilmington, DE). Pouch foil 310 for use with some embodiments is capable of bonding to both metal (e.g., aluminum, copper) and itself (e.g., for heat sealing the foil into a pouch). The PET pouch foil material described above, is an example of one such type of material.

As shown in FIG. 3A, the pouch foil 310 may be aligned with an adhesive substrate 312 that includes anode electrode material bonded thereto. In some embodiments, an oversized piece of anode electrode material may be arranged active side down on adhesive substrate 312. The battery contour may be laser cut in the anode electrode material, and the excess material may be removed. Laser cutting permits any desired battery contour to be created including, for example irregularly-shaped batteries that are not capable of being fabricated using existing battery fabrication techniques. Additionally, laser cutting results in battery components with smooth edges, which reduces or eliminates sharp metal points on the electrodes which have undesirable electrical properties. Alignment holes may also be cut in the adhesive substrate 312. Using pins 320 and an alignment jig (not shown), the adhesive substrate 312 and the pouch foil 310 may be aligned. Once aligned, the adhesive substrate 312 carrying the single-sided active material is laminated to the pouch foil. For example, the lamination may be performed by applying pressure (e.g., 60 psi) for 10 minutes at 130° C. across the entire area of the pouch material.

FIG. 3B shows the pouch foil 310 and the adhesive substrate 312 prior to lamination. FIG. 3C shows a cross section 330 through the layers of the structure in FIG. 3B. As shown in FIG. 3C, the active material formed on adhesive substrate 312 includes an anode material layer 316 and a metal (e.g., copper) layer 314 formed on the anode 316. For example, the metal layer 314 may be a metal backing of a one-sided anode electrode. Any suitable anode material may be used. For example, in some embodiments, a graphite anode electrode at 1.1 mAh/cm$^2$, available from Custom Cells (Itzehoe, Germany) may be used.

As shown, pouch foil 310 may be aligned to overlap with the metal layer 314 to facilitate bonding between the metal layer 314 and the pouch foil 310. Any suitable amount of overlap may be used. In some embodiments an overlap of at least 1 mm is used to ensure good bonding between the metal layer and the pouch foil.

Figure 4A:
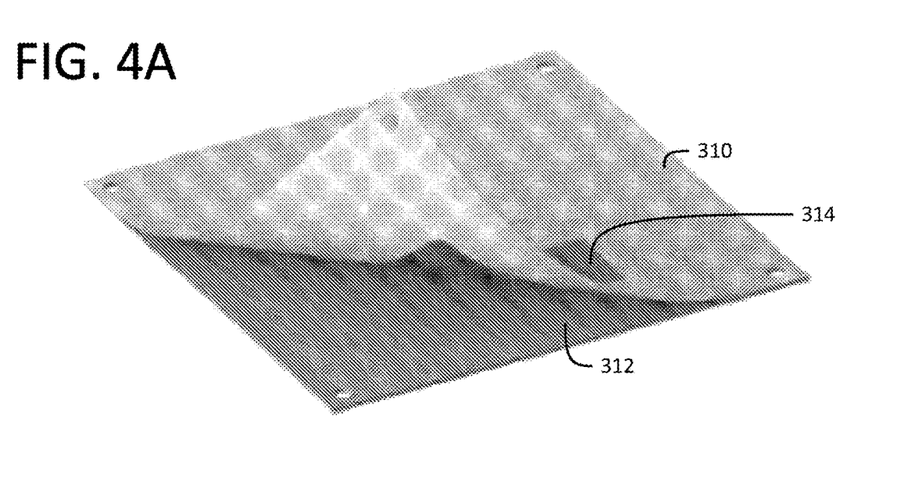
FIGS. 4A-4C schematically illustrate a fabrication process for creating anode and cathode electrodes for use in a lightweight high power battery in accordance with some embodiments.
Figure 4B:
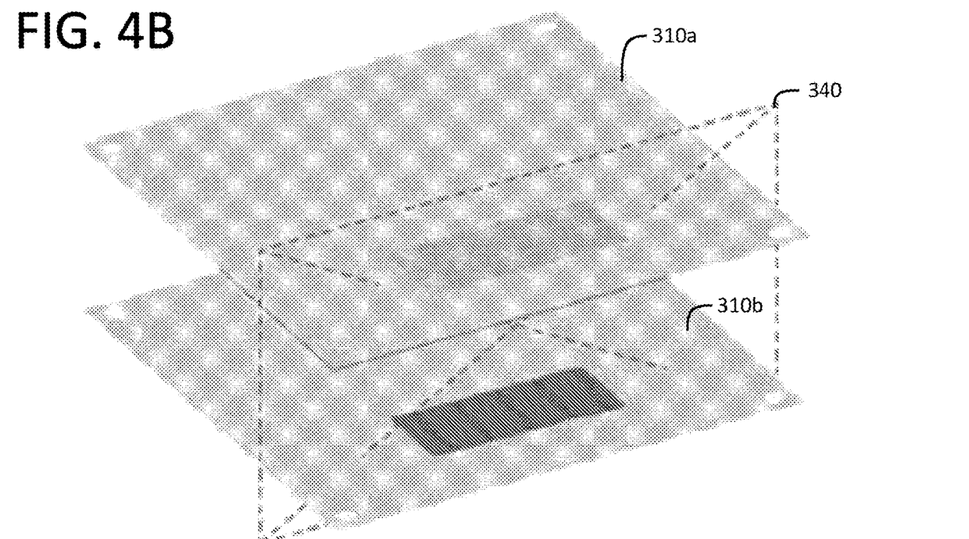
Figure 4C:
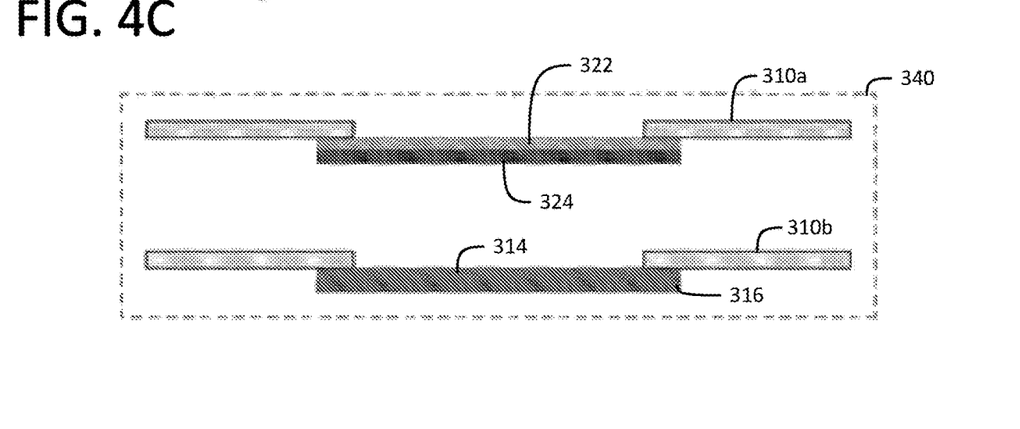

FIG. 4A shows that following lamination the adhesive substrate 312 may be removed, creating an anode electrode with an exposed metal connection 314 on the back and an overhanging portion of pouch foil 310 that can be sealed to itself. The steps shown in FIGS. 3-A-C and FIG. 4A for fabricating the anode electrode may be repeated to fabricate the cathode electrode of the battery. FIG. 4B schematically illustrates a first pouch foil 310a laminated to a cathode electrode structure and a second pouch foil 310b laminated to an anode electrode structure. FIG. 4C shows a cross section 340 through the structure of FIG. 4B. As shown, the cathode structure bonded to the first pouch foil 310a includes metal (e.g., aluminum) layer 322 bonded to pouch foil 310a and a cathode 324 bonded to the metal layer 322. For example, metal layer 322 may be a metal backing of a one-sided cathode electrode. Any suitable cathode material may be used. For example, in some embodiments a lithium nickel cobalt aluminum oxide (NCA) cathode at 1.0 mAh/cm$^2$, available from Custom Cells (Itzehoe, Germany) may be used. As described previously with regard to FIG. 3C prior to lamination, the second pouch foil 310b may be bonded to an anode structure that include anode material 316 and metal (e.g., copper) layer 314 bonded to the pouch foil 310b at the overlapping portion.

Figure 5A:
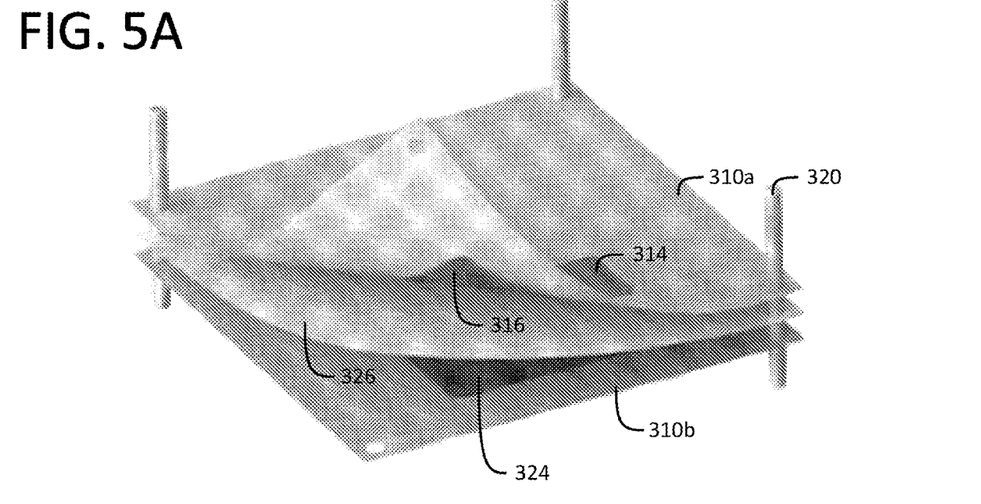
FIGS. 5A-C schematically illustrate a fabrication process for combining the anode and cathode electrodes of FIG. 4C into a stack separated by a separator material in accordance with some embodiments.
Figure 5B:
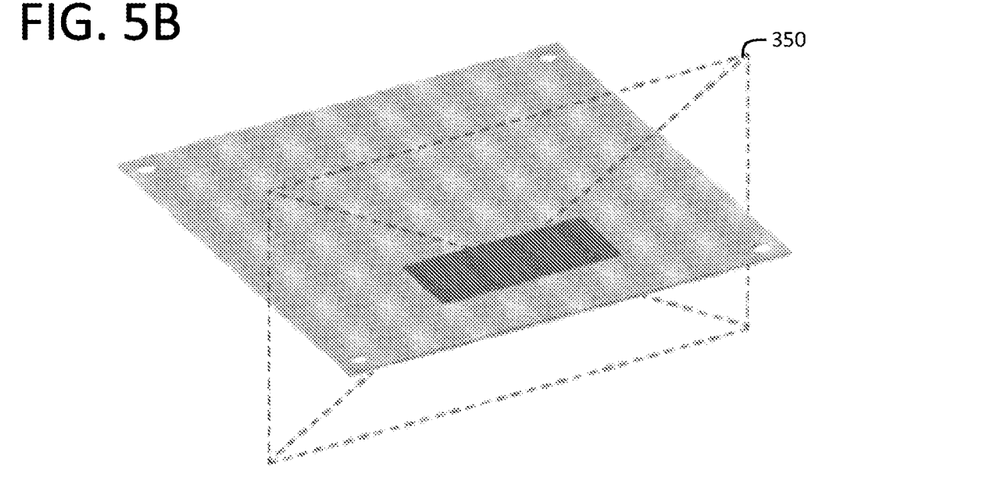
Figure 5C:
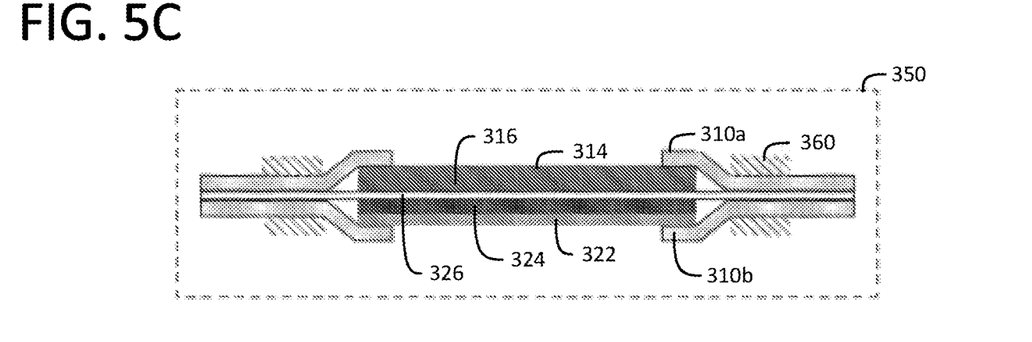

After each of the anode and cathode electrodes are fabricated, the anode and cathode electrodes may be aligned with a separator material 326 arranged between the anode and cathode electrodes as shown in FIG. 5A. FIG. 5B shows the aligned stacked structure of FIG. 5A, and FIG. 5C shows a cross section 350 through the electrode portion of the structure of FIG. 5B. As shown in FIG. 5C, the stacked electrode structure includes both anode (316) and cathode (324) material layers separated by separator material 326. The metal backings (314, 322) of the anode and cathode electrodes are bonded to respective pouch foils (310a, 310b) at the overlapping portions of the pouch foils with the metal layers. FIG. 5C further shows that the first pouch foil 310a may be bonded to the second pouch foil 310b by, for example, using heat sealing to create a pouch within which a liquid electrolyte may be added. In some embodiments, one side of the battery structure may be heat sealed and electrolyte may be pipetted on either side using, for example, 15 µL per mAh of battery capacity. In other embodiments, liquid electrolyte may be added in any other suitable manner.

A bar sealer, available from McMaster Carr, Elmhurst, IL, and a vacuum sealer, e.g., Fuji Impulse FCB-200, available from Osaka, Japan may be used to bond the pouch layers and provide the final battery seal. For embodiments that include irregularly-shaped batteries, a different sealing apparatus may be used. Pressure plates and layers of foam may be used to apply 40 psi uniformly to all batteries on test. In some embodiments, the electrodes, separator, pouch and pouch materials may be laser cut using a diode-pumped Nd:YVO$_4$ laser, q-switched and frequency tripled to 355 nm, available from Oxford Laser Systems, Didcot, UK.

Batteries created in accordance with the techniques described herein were characterized on a battery tester (BSC-815, Bio-Logic, Sessynet-Pariset, France). The electrochemical characterization was performed either at room temperature, or in a VWR incubator set to 45° C. For power characterization, the batteries were charged for 4 hours at C/4 rate based on capacity specifications from the electrode supplier, then discharged at rates of up to 50 C. The voltage safety limits were: 4.4 V upper limit during charge and 1 V lower limit on discharge. For cycle life testing the same voltage limits were used while the charge and discharge rates of the battery were set to C/4.

Figure 6A:
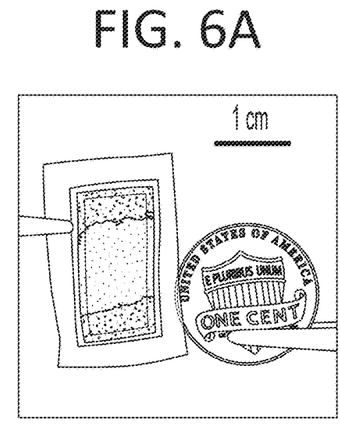
FIG. 6A illustrates an example of a lightweight high power battery created in accordance with some embodiments.

FIG. 6A shows an example of battery fabricated in accordance with the techniques described herein. The battery may be used to establish high power density. As shown, the active materials cover 2 cm×1 cm and the battery weighs less than 140 mg after electrolyte addition and heat sealing, resulting in small lightweight battery.

Table 1 below shows some weight characteristics of the battery shown in FIG. 6A.

TABLE 1

Comparison of individual component weights of battery shown in FIG. 6A

| Component | Weight (mg) | Percent of total |
|---|---|---|
| Graphite on copper foil | 35.4 | 25.3% |
| Cathode on aluminum foil | 47.1 | 33.6% |
| Separator | 2.9 | 2.1% |
| Pouch foil | 29.1 | 20.8% |
| Electrolyte | 25.5 | 18.2% |
| Total | 140.0 | 100% |

As shown in Table 1, the pouch material corresponds to a significant percentage of the total battery weight (>20%). The comparison is for a 140 mg, 2 mAh battery using lithium manganese oxide as cathode and graphite as anode.

Figure 6B:
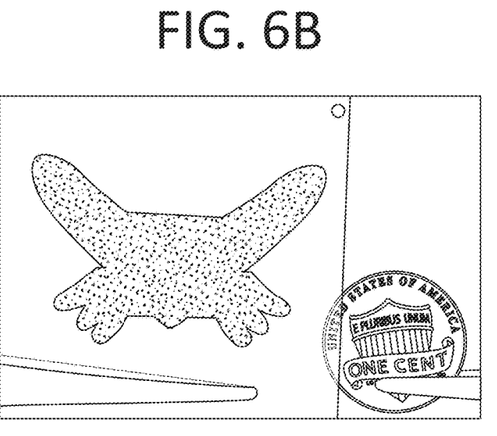
FIG. 6B illustrates an irregularly-shaped lightweight high power battery created in accordance with some embodiments.

The fabrication process described herein is extremely versatile and can be modified to solve additional design challenges. For example, the inventors have recognized that the flexibility and precision of the laser cutting process for fabricating batteries in accordance with the techniques described herein enables the creation of batteries with custom shapes. Custom seal profiles may be possible to create tailored batteries to fit unique device geometries. For example, FIG. 6B shows an example of an irregularly-shaped anode electrode for custom shape batteries. Creation of irregularly-shaped batteries is not possible using conventional Li-ion battery fabrication processes that do not use laser cutting techniques. An advantage of fabricating batteries in custom shapes is to be able to fit the battery into any available space in a device while reducing an amount of unused space that would be present if a conventional prism- or cylindrically-shaped battery was used. Accordingly, the battery may become part of the overall device design and may be used to power small devices where reducing the amount of space that the battery takes up is important.

The fabrication techniques described herein may also be used to make other versatile lightweight batteries. Conventional Li-ion batteries are typically arranged in parallel to make higher voltage batteries because placing such batteries in series and applying a large voltage (e.g., 7 or 10 volts) across the electrolyte typically results in irreversible electrolyte oxidation. The inventors have recognized that lightweight high power battery cells fabricated in accordance with the techniques described herein may be safely and efficiently connected in series to provide a higher voltage battery at a small scale. Since the electrolyte is fully enclosed in the pouch material, two or more electrochemical cells fabricated in accordance with the techniques described herein may be stacked in a series configuration to yield a higher voltage battery. Such high voltage batteries may be beneficial for providing an optimal electrical efficiency to some electrical circuits. For example, some power electronics circuits may operate most efficiently when provided with a power of 14 volts (or some other high voltage). A 14 V power source to power the circuit may be created by fabricating and connecting in series four 3.5 V small batteries created in accordance with the techniques described herein.

Figure 6C:
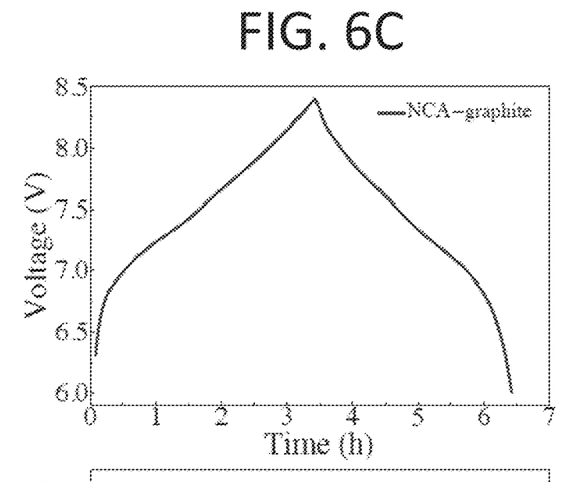
FIG. 6C illustrates a voltage vs. time plot during a full charge and discharge cycle for a battery made from two series-connected lightweight high power batteries created in accordance with some embodiments.

A single cell output higher than 3.7 V may be useful in applications where voltage needs to be amplified, such as to drive piezoelectric actuators. In particular, a higher starting voltage may provide a significant boost to the overall energy efficiency of the system. FIG. 6C shows a voltage vs. time profile over charge and discharge of a 7.4 V battery made from two single cells connected in series. Each of the 3.7 V battery cells connected in series is a lightweight high power battery fabricated in accordance with the techniques described herein. As described above, the high starting voltage of the 7.4 V battery may boost the energy efficiency of miniaturized power electronics.

Figure 6D:
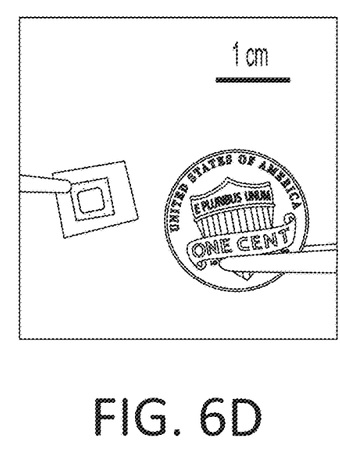
FIG. 6D illustrates an example of a small battery enclosed in a lightweight pouch created in accordance with some embodiments.

In some embodiments, the size of each electrode can be made very small. FIG. 6D shows an example of a small square battery with 3 mm sides after assembly using the fabrication process illustrated in FIGS. 3-5. The miniaturized battery weights 14 mg and is at the limit of manual assembly capability. Fabrication of smaller batteries using the techniques described herein using robotic-assisted assembly techniques may be possible. Such a battery is 20 times lighter than the lightest commercially-available liquid electrolyte battery, yet delivers half the power density.

Figure 6E:
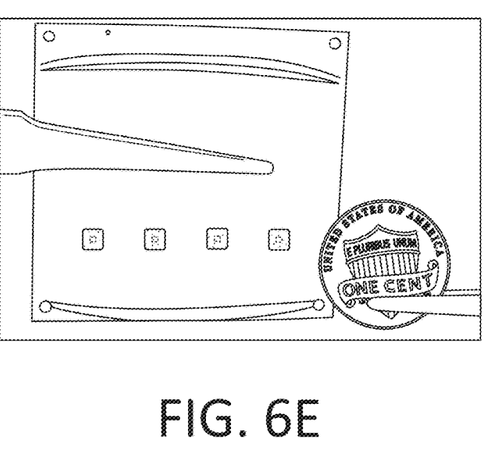
FIG. 6E illustrates a set of four lightweight cathodes mounted on a supporting plastic sheet in accordance with some embodiments.

FIG. 6E shows a parallel fabrication capability of some embodiments. As shown, a plurality of small cathodes (3 mm squares on a side) fabricated on a single sided adhesive sheet may be fabricated using the techniques described herein. Parallel fabrication of lightweight high-power batteries in accordance with the techniques described herein facilitates scaling up of the battery fabrication process, when a larger number of batteries is desired.

Figure 6F:
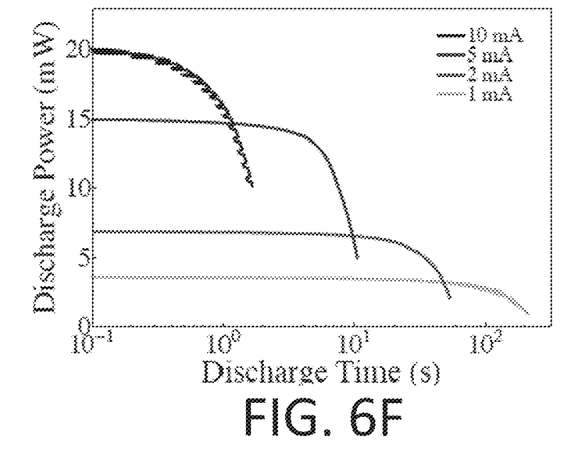
FIG. 6F illustrates a discharge power vs. time plot for a lightweight high power battery created in accordance with some embodiments.

FIG. 6F shows battery characteristics for the example small square battery shown in FIG. 6D. In particular, discharge power as a function of time is shown for the 0.1 mAh battery tested at 45° C. As shown, the battery weighs only 14 mg, but can deliver more than 1 kW/kg for short durations.

Figure 7A:
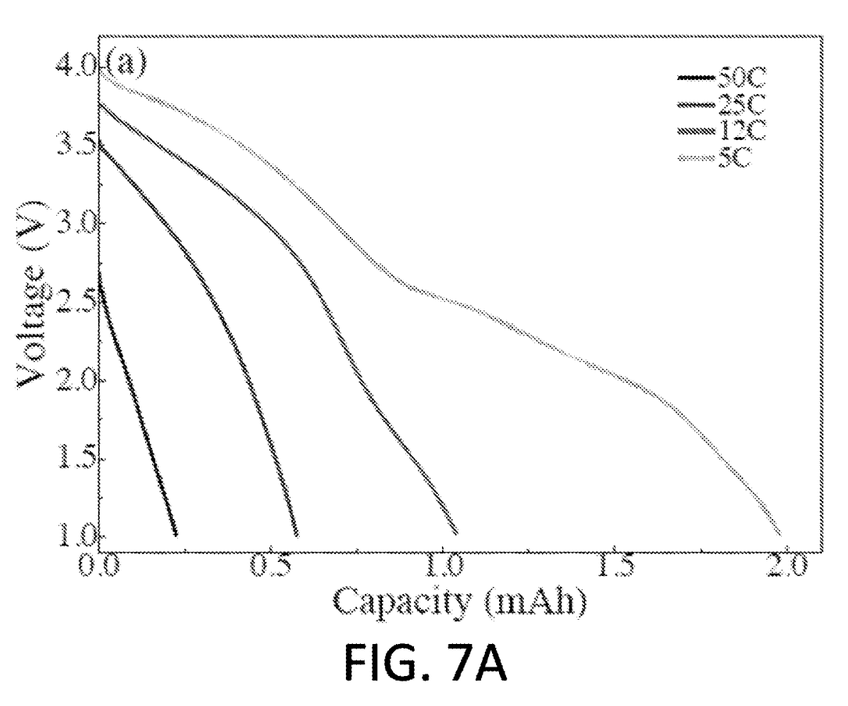
FIG. 7A illustrates a voltage vs. capacity plot showing characteristics of a lightweight high power battery created in accordance with some embodiments.
Figure 7B:
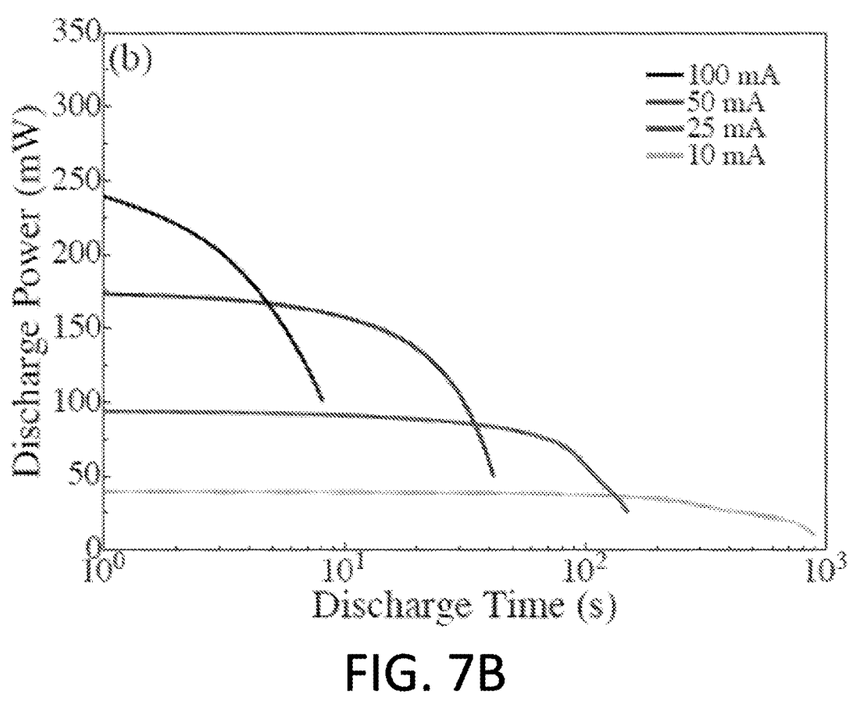
FIG. 7B shows a discharge power vs. time plot for a lightweight high power battery created in accordance with some embodiments.

FIG. 7A shows a battery characteristics for the $LiMn_2O_4$ (LMO)-graphite 2 mAh 140 mg battery illustrated in FIG. 6A created in accordance with the techniques described herein. As shown, when tested at room temperature the battery was ionically limited in discharge voltage vs. discharge capacity. Currents are given in C-rates. FIG. 7B shows that as a result of this ionic limiting, high power is available for shorter durations of time, as shown in discharge power as a function of time for the same battery as FIG. 7A, tested at room temperature.

Figure 8:
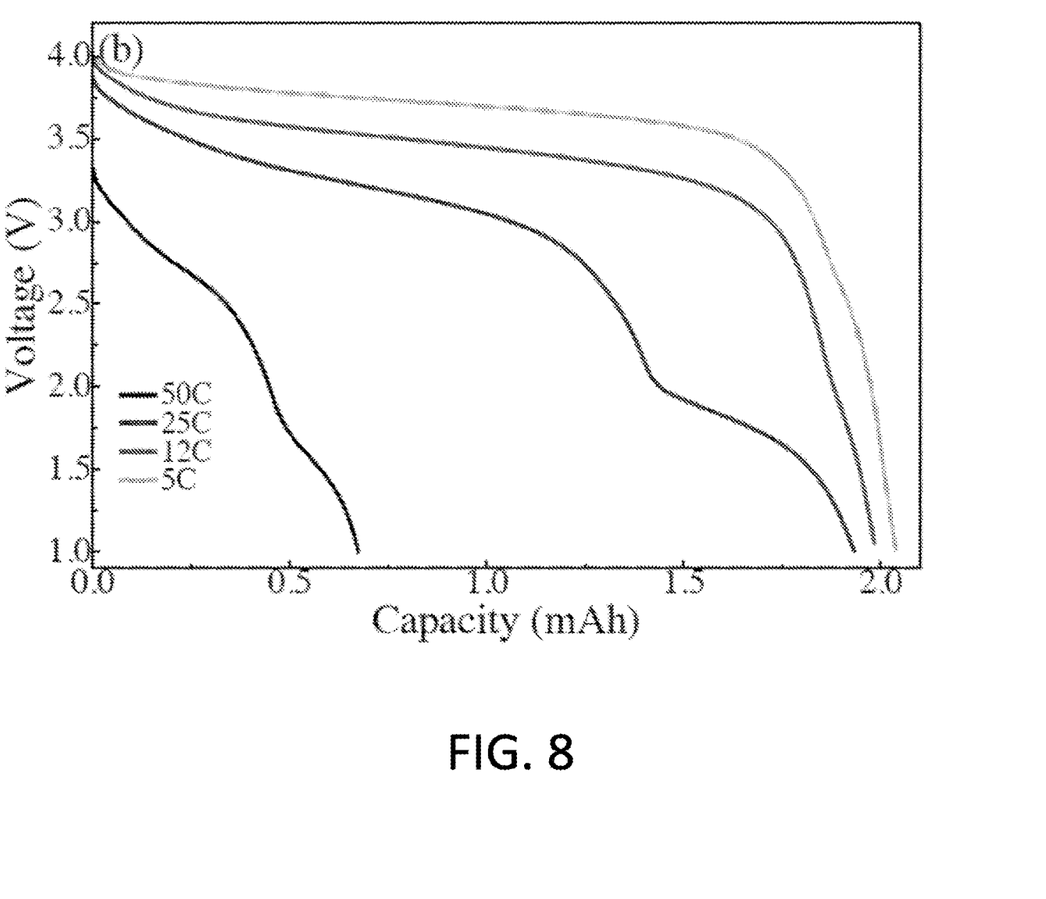
FIG. 8 illustrates a voltage vs. capacity plot showing characteristics of a lightweight high power battery created in accordance with some embodiments.
Figure 9:
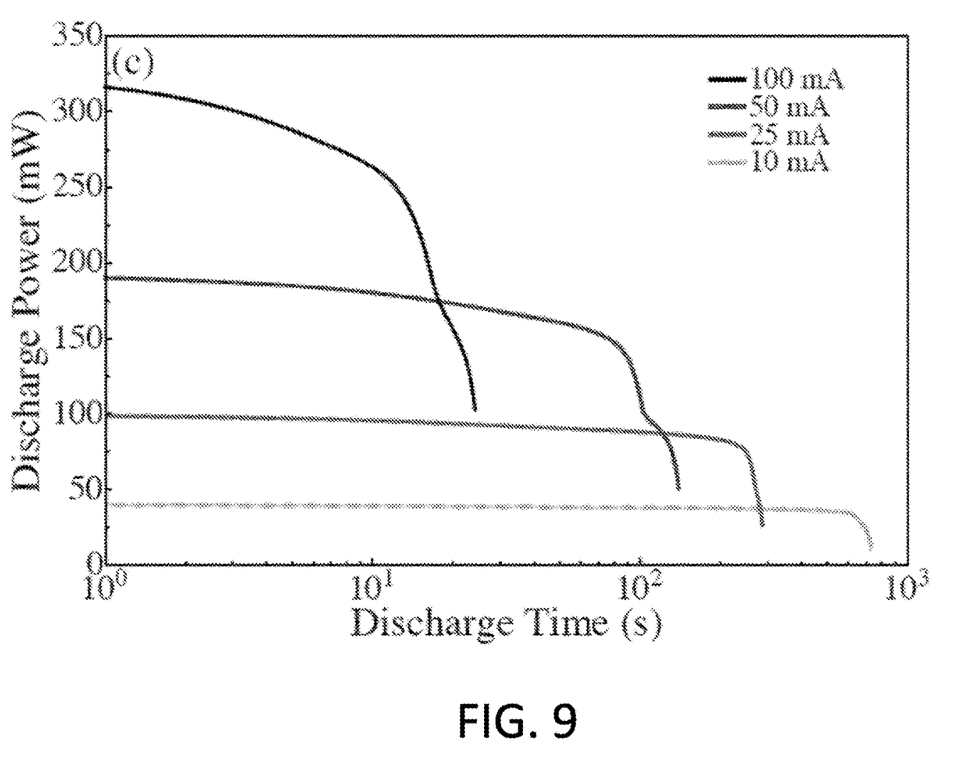
FIG. 9 shows a discharge power vs. time plot for a lightweight high power battery created in accordance with some embodiments.

As discussed above, an important metric for lightweight high-power batteries fabricated in accordance with the techniques described herein is power density per unit of battery weight, as this measure may dictate the types of possible applications. In a sample of batteries created using the techniques described herein, the highest power density (>1 kW/kg) was observed in a $LiMn_2O_4$ (LMO)-graphite cell (shown in FIG. 6A), which weighed 140 mg and was tested at 45° C. FIG. 8 shows voltage vs. capacity curves for the battery and FIG. 9 shows a plot of discharge power as a function of discharge duration, which may be more useful in comparing the available power with the requirements of different applications: including sensing, computation, and actuation. For reference, the battery weight (140 mg) is similar to some of the smallest and lightest micro robots (<100 mg) while delivering sufficient power for autonomous locomotion (e.g., 100-200 mW). As shown in FIGS. 7A and 7B, the 140 mg battery of FIG. 6A is still capable of delivering >1 kW/kg, when tested at room temperature (25° C.).

The difference in performance at 25° C. and 45° C. suggest the batteries are limited by ion transport processes. Ionic limits are expected for these types of batteries given that the electrolyte is pipetted on the surface of the electrode. The electrolyte addition process limits how much of the electrode is infused with electrolyte and therefore chemically active. Other electrolytes and assembly methods may alternatively be used to improve wetting of the electrodes.

Some embodiments are directed to a hybrid manufacturing approach that relies on conventional, commercially available materials and laser micro machining techniques to deliver a battery with high power at the mesoscale. At comparable weight some batteries created using the fabrication techniques described herein have a power density 100 times higher than commercially-available batteries. At comparable power density, batteries created using the fabrication techniques described herein are 20 times lighter than the lightest commercial device. The process is extremely versatile and can be modified to create customized shape and weight batteries, as well as solutions for unconventional requirements, such as deformable or high voltage batteries. Such high power density batteries may be useful for a broad class of lightweight applications, including wearable and biomedical devices, as well as miniature robots.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A lightweight high power battery, comprising:
    an active structure including:
        an anode electrode having a first side and a second side opposite the first side;
        a first metal layer formed on the first side of the anode electrode;
        a cathode electrode having a first side and a second side opposite the first side;
        a second metal layer formed on the second side of the cathode electrode; and
        a separator material arranged between the second side of the anode electrode and the first side of the cathode electrode;
    a liquid electrolyte; and
    a non-metallic pouch arranged to encapsulate the active structure and the liquid electrolyte, wherein the non-metallic pouch is bonded to a first portion of the first metal layer, the first portion being positioned between the non-metallic pouch and the anode electrode, and
    wherein the non-metallic pouch is bonded to a second portion of the second metal layer, the second portion being positioned between the non-metallic pouch and the cathode electrode.

2. The lightweight high power battery of claim 1, wherein the non-metallic pouch comprises a material that binds to both a metal and itself.

3. The lightweight high power battery of claim 1, wherein the battery has a weight less than 1 gram.

4. The lightweight high power battery of claim 3, wherein the battery has a weight less than 300 mg.

5. The lightweight high power battery of claim 1, wherein the battery has a power density of at least 1 kW/kg for a duration of at least one second.

6. The lightweight high power battery of claim 1, wherein the battery has an irregular shape.

7. The lightweight high power battery of claim 1, wherein the first metal layer comprises copper.

8. The lightweight high power battery of claim 1, wherein the second metal layer comprises aluminum.

9. A lightweight high power battery, comprising:
    an active structure including an anode electrode, a single cathode electrode, and a separator material arranged between the anode electrode and the single cathode electrode;
    a liquid electrolyte; and
    a non-metallic pouch arranged to encapsulate the active structure and the liquid electrolyte and comprising a top layer and a bottom layer, wherein the active structure is positioned between the top layer and the bottom layer of the non-metallic pouch.

* * * * *